(12) United States Patent
De Backer

(10) Patent No.: US 9,850,017 B2
(45) Date of Patent: Dec. 26, 2017

(54) NO SEW BORDER LABEL

(71) Applicant: Avery Dennison Corporation, Mentor, OH (US)

(72) Inventor: Mathieu De Backer, Grottammare (IT)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/090,304

(22) Filed: Nov. 26, 2013

(65) Prior Publication Data

US 2015/0147491 A1    May 28, 2015

(51) Int. Cl.
| | |
|---|---|
| *B65C 5/02* | (2006.01) |
| *B32B 3/06* | (2006.01) |
| *B32B 7/14* | (2006.01) |
| *B32B 3/08* | (2006.01) |
| *G09F 3/18* | (2006.01) |
| *G09F 3/00* | (2006.01) |
| *G09F 3/20* | (2006.01) |
| *G09F 3/10* | (2006.01) |
| *G09F 21/02* | (2006.01) |
| *G09F 3/02* | (2006.01) |

(52) U.S. Cl.
CPC .......... *B65C 5/02* (2013.01); *B32B 3/06* (2013.01); *B32B 3/08* (2013.01); *B32B 7/14* (2013.01); *G09F 3/0288* (2013.01); *G09F 3/10* (2013.01); *G09F 3/18* (2013.01); *G09F 3/201* (2013.01); *B32B 2250/03* (2013.01); *B32B 2519/00* (2013.01); *G09F 2003/025* (2013.01); *G09F 2003/0264* (2013.01); *G09F 2003/0282* (2013.01); *G09F 2021/023* (2013.01); *Y10T 428/24802* (2015.01)

(58) Field of Classification Search
None
See application file for complete search history.

(56) References Cited

U.S. PATENT DOCUMENTS

| | | | | |
|---|---|---|---|---|
| 5,561,932 | A * | 10/1996 | Bracken | .......................... 40/638 |
| 5,987,790 | A | 11/1999 | Sullivan | |
| 6,263,598 | B1 | 7/2001 | Sullivan | |

(Continued)

FOREIGN PATENT DOCUMENTS

| | | |
|---|---|---|
| KR | 20100033235 | 3/2010 |
| WO | 2008017037 | 2/2008 |

OTHER PUBLICATIONS

International Search Report and Written Opinion dated Jan. 31, 2014 for International Application No. PCT/US2013/071915 filed Nov. 26, 2013.

*Primary Examiner* — Laura Powers
(74) *Attorney, Agent, or Firm* — Avery Dennison Retail Information Services, LLC

(57) ABSTRACT

A frame web assembly for securing a label to an apparel item is provided. The assembly includes a substrate, a label, and a frame web. The frame web includes a carrier web having first and second faces, the first face having an adhesive, and at least one frame element with the first side having an adhesive and the second side in contact with the first face of the carrier web. The present invention also includes a method for branding the apparel item which includes applying a frame element over the woven label and then adhering the woven label and frame element to an apparel item.

18 Claims, 10 Drawing Sheets

(56) References Cited

U.S. PATENT DOCUMENTS

| | | |
|---|---|---|
| 6,277,458 B1* | 8/2001 | Dirksing et al. ............. 428/42.3 |
| 6,533,180 B1 | 3/2003 | Wood |
| 6,948,743 B1 | 9/2005 | Peterson |
| 7,146,649 B2 | 12/2006 | Kronenbeger |
| 7,364,783 B2 | 4/2008 | Nordstrom |
| 7,411,659 B1* | 8/2008 | Gaetano ......................... 355/74 |
| 7,767,600 B1 | 8/2010 | Figueroa |
| 2003/0150341 A1* | 8/2003 | Ciaramitaro et al. ........ 101/129 |
| 2009/0094874 A1 | 4/2009 | Smith et al. |
| 2010/0300613 A1* | 12/2010 | Stogbauer et al. ........... 156/256 |

* cited by examiner

NO SEW BORDER LABEL

CROSS-REFERENCE TO RELATED APPLICATION

The present application claims the benefit of U.S. Provisional Application No. 61/730,997 filed Nov. 29, 2012, which is incorporated herein by reference in its entirety.

FIELD OF THE INVENTION

The present invention is found in the field of label embellishments or decorations for apparel or fashion accessories. More particularly, the invention relates to an intermediate assembly used for securing an embellishment or label to an article and the resulting assembly. The present invention includes a label, such as a woven label or embellishment, secured through use of a positionable frame element that adheres the periphery of the label to a clothing article thereby creating a new edge sealing configuration having enhanced aesthetic features.

BACKGROUND OF THE INVENTION

It is often desirable to decorate an article for reasons of self-expression, brand identification or aesthetics and/or to label the article with information of the type including, but not limited to, price, size, a designation of source, instructions for use and care, etc. For certain articles, such decoration and/or labeling may be accomplished by printing or otherwise transferring such subject matter directly onto the article. However, many articles are not well-suited for direct printing or imaging. Another known method of applying a fabric label to an article is by sewing or stitching. However, sewing of fabric labels is costly and time consuming as it requires an additional labor component to complete the affixing of the label to the article. As another alternative, heat transfer methods may also be used, where a label is provided with a heat softenable adhesive, which upon application of heat causes the adhesive to soften and bond the label to the article.

Heat-transfer label assemblies are well known and widely used in the art. Heat-transfer label assemblies are typically manufactured as a continuous roll and commonly include a label-carrying continuous web (also commonly referred to simply as a carrier web), such as a polyethylene coated paper sheet, a release layer (also commonly referred to as a release mechanism or release sheet), such as a wax or silicone release layer, affixed onto a surface of the carrier web and a heat-transfer label (also commonly referred to simply as a label), which is disposed on the release layer. The heat-transfer label typically includes a protective layer affixed onto the release layer, an ink design layer placed onto the protective layer and an adhesive layer disposed over the ink design layer. Heat transfer assemblies can be costly and are typically designed for large single-print jobs where a single type of label may be applied hundreds or thousands of times in order to reduce the overall cost of the label production.

Pressure sensitive adhesive is frequently used in prior art labeling, particularly with respect to the labeling of paper, or cardboard boxes, or other containers having a surface to which typical pressure sensitive adhesives successfully adhere. However, the use of pressure sensitive adhesives typically does not produce satisfactory results in connection with the labeling of garment pieces, because the pressure sensitive adhesives do not adhere sufficiently strongly to the garment pieces in order to perform the intended function of the labeling associated with garments. Such labeling must be capable of successfully withstanding repeated home or commercial laundering or dry cleaning.

What is needed therefore is an application system to provide the aesthetic attributes of a sewn or stitched label or embellishment without the cost of application associated with prior art methodologies. The current application introduces a novel approach to adhering woven and other brand identification labels to articles, more particularly apparel items such as clothing, garments or related accessories. The approach, as discussed below, utilizes an adhesive system to adhere a woven label to a fabric garment by a frame element, with or without the use of heat.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In one embodiment of the present invention, an assembly for securing a label is described and includes a substrate, a label, a carrier web and a frame element. The substrate has first and second surfaces. The label has first and second sides and an external perimeter, with the first side containing indicia and the second side having an adhesive. The carrier web has first and second faces, with the first face having an adhesive. The frame element has a first side with an adhesive and second side in contact with the first face of the carrier web. The frame element has an inner perimeter which is smaller than the external perimeter of the label and an outer perimeter larger than the external perimeter of the label.

In another embodiment of the present invention, a method for making branded apparel item is described and includes the steps of providing an apparel item and creating an image on a label. Next, the label is applied to a surface of the apparel item and a carrier layer having a frame element thereon is applied over the label such that at least a portion of the frame element is at least in contact with the peripheral edge of the label. The carrier layer is then removed from the frame element so that the label remains attached to the apparel item with the frame element.

In another embodiment of the present invention, a frame web for attaching a label to an article is described and includes a carrier web having first and second faces, the first face having an adhesive, and at least one frame element having first and second sides with the first side having an adhesive and the second side in contact with the first face of the carrier web.

The frame element is provided on a carrier web prior to application. The carrier web has a release coating to allow the frame element to be separated from the carrier for attachment to the label. The frame element can be composed of any suitable material such as polyester, polyethylene, cellulosic materials and the like.

In a still further embodiment, an apparel article garment, or an accessory for a garment, collectively an apparel article, is described and includes an apparel article having first and second surfaces. A label having first and second sides and having an external perimeter is provided. The label has an adhesive on a second side and indicia on the first side. The label is attached to a portion of the apparel article. In connection with the present embodiment, a frame element which has first and second sides is provided. The second side of the frame element is positioned to be in contact with the label. The frame element has an inner perimeter smaller than the external perimeter of the label and an outer perimeter larger than the external perimeter of the label.

In an exemplary embodiment, the label is woven.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

The present invention includes a frame removably, supported on a carrier web for use in attaching a label that is to be applied to an apparel item. The present invention further includes an assembly for securing a label and article together by the frame element and a method for attaching a label to an article using the assembly and frame element for securing a label to the article.

Figure 1:
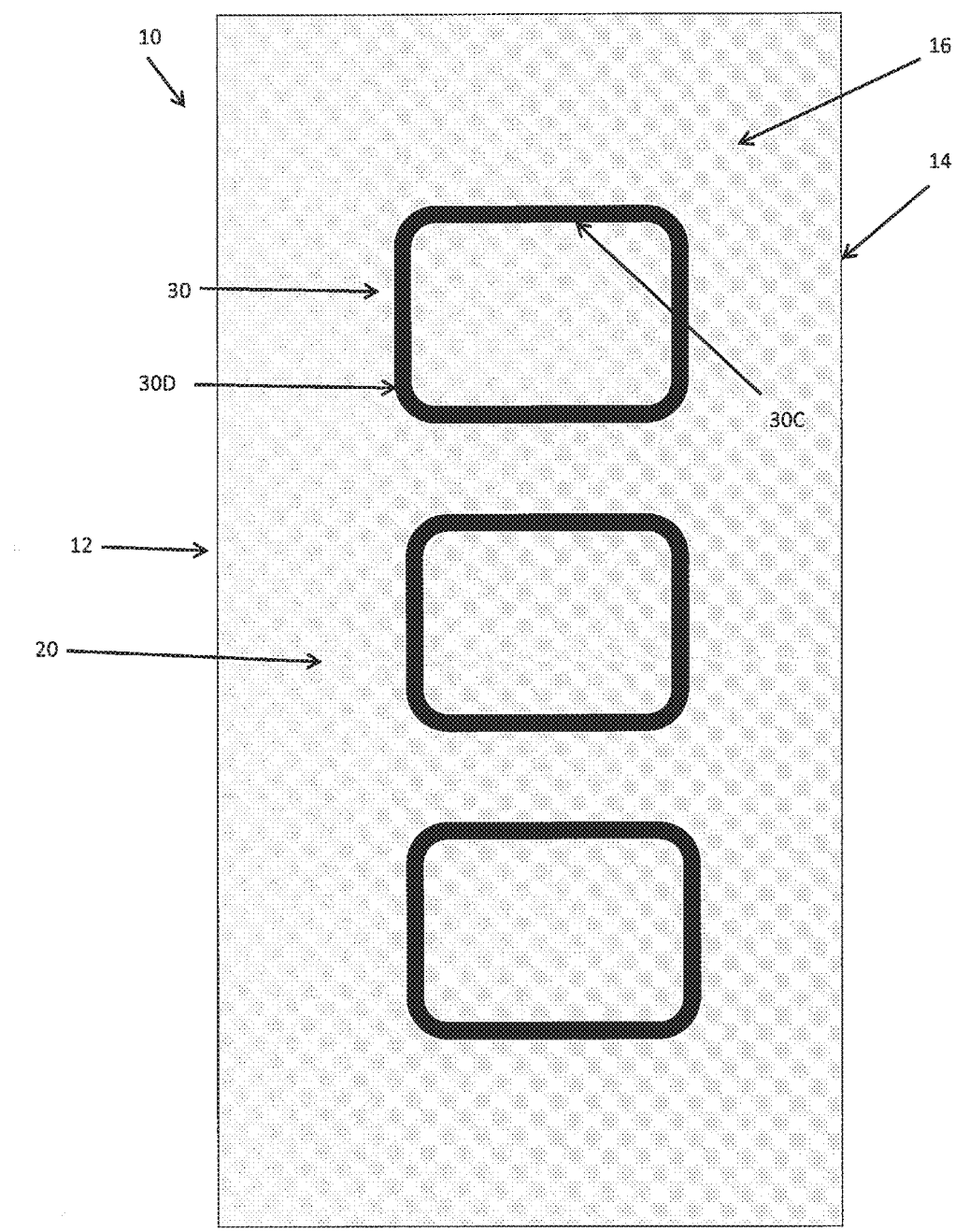
FIG. 1 is a schematic illustration of a preferred embodiment of a frame web in accordance with the current invention.

FIG. 1 shows and exemplary embodiment of the frame web 10 of the current invention. The frame web 10 can also be referred to as a carrier web 10 and has at least one frame element 30 removably disposed on one surface of the web. The carrier web or frame web 10 has outer edges 12 and 14 and a release coating or alternatively a light tack adhesive coating 20. The frame element 30 is removably held to the carrier web by an adhesive or other frangible bond. Alternatively, if an adhesive coating is provided on the carrier web 10 and no release material is provided on the carrier web 10, the adhesive will have a lower affinity or strength for the carrier web than the frame element will have for the article to which it will eventually be attached so that the frame element may be easily removed.

The carrier web 10 has a surface layer 16 in the different embodiments of the current invention and can include a variety of materials and may be monolayered or multilayered. The carrier web 10 may be paper based or polymeric based. A multilayered carrier surface layer 16 may have one or more layers selected from the group including a paper based layer, a polymeric based layer, and combinations of two or more of any of the foregoing layers. The polymeric based layer may include a thermoplastic resin such as a polyolefin, a polyester, or a mixture of the two. The carrier layer in a preferred embodiment is paper based.

The carrier surface layer 16 of the frame or carrier web 10 of the various embodiments of the current invention can be provided in a variety of shapes, sizes and colors depending on the application. The shape and size of the carrier web 10 may be dependent on the shape of the frame element and number of frame elements attached to the surface 16. The carrier web 10 can be a single piece with only one frame element or a continuous web of frame elements as is depicted in FIG. 1. If the carrier web 10 is in the form of a web, the web 10 can be rolled for storage or transport. Additionally, the carrier web can be any color or transparency desired. The carrier web can be white or other color, and solid, translucent, or transparent.

The at least one frame element 30 can be constructed from a variety of materials. Various materials include paper based or polymeric based products. The frame element may include at least one thermoplastic resin. The at least one thermoplastic resin can be a polyolefin, an alkene-unsaturated carboxylic acid or unsaturated carboxylic acid derivative copolymer, a styrene-based homopolymer or copolymer, a polyurethane, a poly(vinyl chloride), a polycarbonate, a polyamide, a polymethacrylate or polyacrylate, a fluoropolymer, a polyester, or a mixture of two or more of any of the foregoing thermoplastic resins. The polyolefin may also comprise a polyethylene, a polypropylene, or a mixture of the two polymers. The polyethylene may consist of a polyethylene homopolymer, a polyethylene copolymer, or a mixture of two or more of any of the foregoing polyethylene polymers. In one exemplary embodiment, the at least one frame element is preferably composed of polyurethane.

The at least one frame element 30 of the current invention is not limited by size, color or shape. The size and shape of the frame element 30 may be adjusted to accommodate for the size and the shape of the woven label that is attached to an article. For example a rectangular woven label would likely require a rectangular frame element, a circular woven label, a circular frame element, etc. The color of the frame element 30 may be adjusted depending on the desired final appearance. Additionally, the frame element 30 can be any color or transparency desired. The frame element can be white or other color, and solid, translucent, or transparent. The frame element 30 may also be provided in various colors to match the label or highlight the article to which it is attached. For example, the frame element 30 may be produced with a fluorescent ink or material so that the frame element 30, creating a border around the woven label, may glow in the dark. The frame element 30 can increase the aesthetic appearance of the label 60 by seeming to give the label 60 a raised peripheral edge to make the edge appear to have an embroidered look, e.g. a look that appears to be similar to stitching or sewing. The frame element 30 may also be provided with a textured surface or a printed appearance to make the frame element 30 look more like sewing or stitching. The frame element 30 may also be provided with a reflective material so as to increase safety. The reflective material may be prismatic or beaded material and is available from Avery Dennison Corporation, through its Reflective Product Division of Niles, IL.

The frame web 10 and frame assembly 30 of the current invention may contain several adhesive layers. Each of these adhesive layers may include at least one type of adhesive. The at least one adhesive may include a pressure sensitive adhesive. The pressure sensitive adhesive may be a hot melt adhesive, a solvent based adhesive, or an emulsion adhesive. The pressure sensitive adhesive may include a styrene block copolymer based hot melt adhesive or an acrylic based emulsion adhesive to include copolymers of acrylic acid esters and optionally acrylic acid. The adhesive may be a permanent adhesive. The permanent adhesive can be one of any of those known in the art including, but not limited to, acrylate, epoxy or plastic polymers. Additionally, the at least one adhesive may be a thermally activatable adhesive. The thermally activatable adhesive may be any of those known in the art including, but not limited to, polyester, acrylic or polyamide adhesives.

FIGS. 2 through 6 show multiple views of different possible embodiments of the frame web 10 of the current invention. In the frame web 10, the carrier web 10 has two faces, a first face 10A and second face 10B (see FIG. 5). The first face 10A is coated with at least one adhesive layer 20. The adhesive layer 20 is preferably a pressure sensitive adhesive, but may be any of known usable varieties of adhesive. In an exemplary embodiment, the adhesive layer 20 is a light tack adhesive. The adhesive layer 20 may be applied in a continuous layer or may be applied in a particular patterned arrangement. If the adhesive layer 20 of the carrier web is patterned, it may align with the sides of the at least one frame element 30.

The frame element 30 attaches to the carrier web 10 at its first side 30A with the first face 10A of the carrier web 10. The frame element has second side 30B, which is provided with an adhesive 40. Adhesive 40 may be a pressure sensitive adhesive, thermally activatable adhesive or any other known variety of adhesive. In an exemplary embodiment, the adhesive layer 40 is a permanent adhesive. A frame web 10 may include a single frame element 30 on a carrier web 10 or multiple frame elements 30 on a carrier web 10 as seen in FIG. 2.

Adhesive bonding between frame and carrier is not as strong as the adhesive bonding between frame element 30 and label/garment so that the frame element will be readily removable from the carrier web 10 when the frame element 30 is applied to an article 60.

Figure 2:
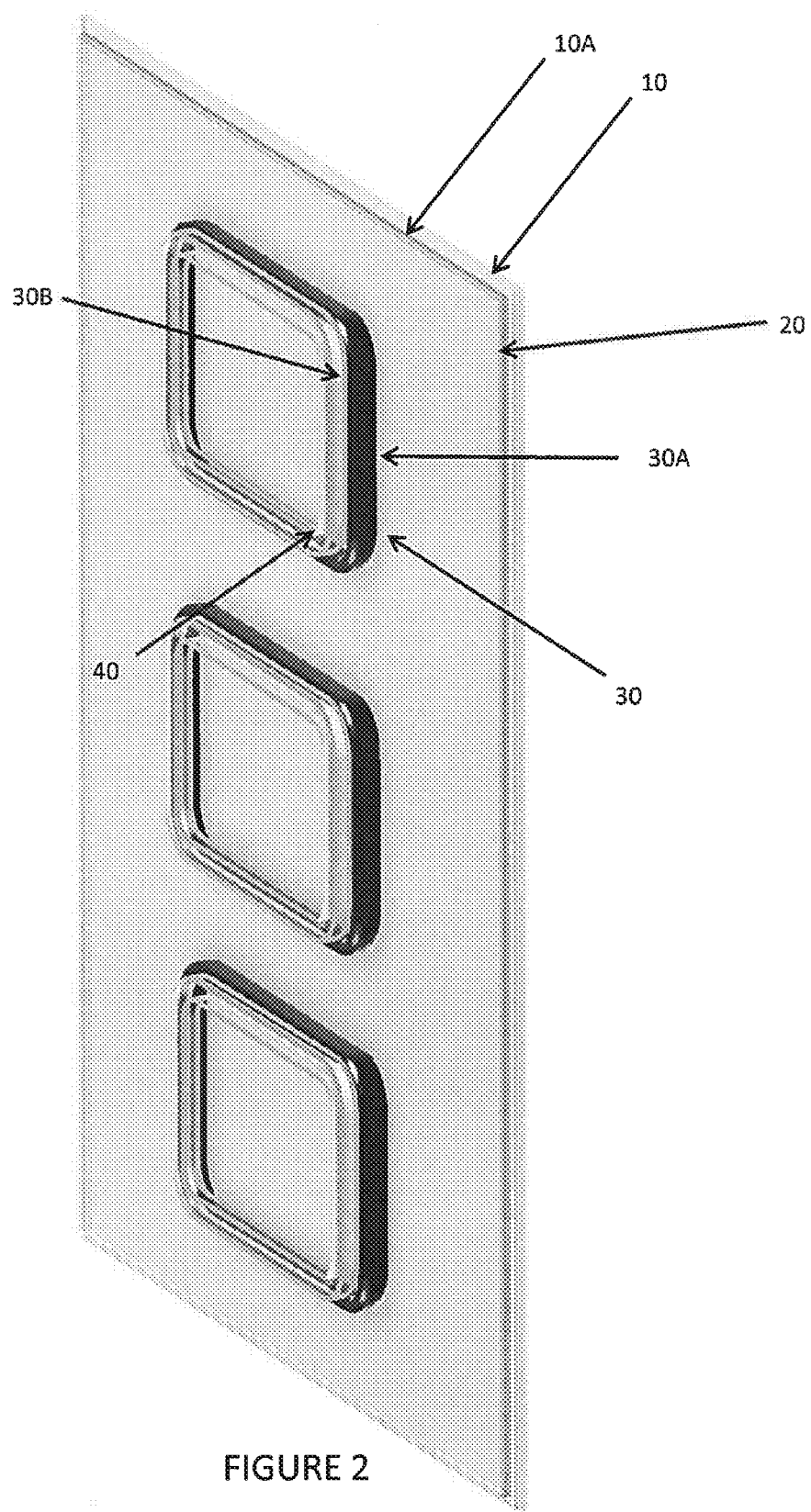
FIG. 2 is an isometric view of a preferred embodiment of a frame web in accordance with the current invention.
Figure 3:
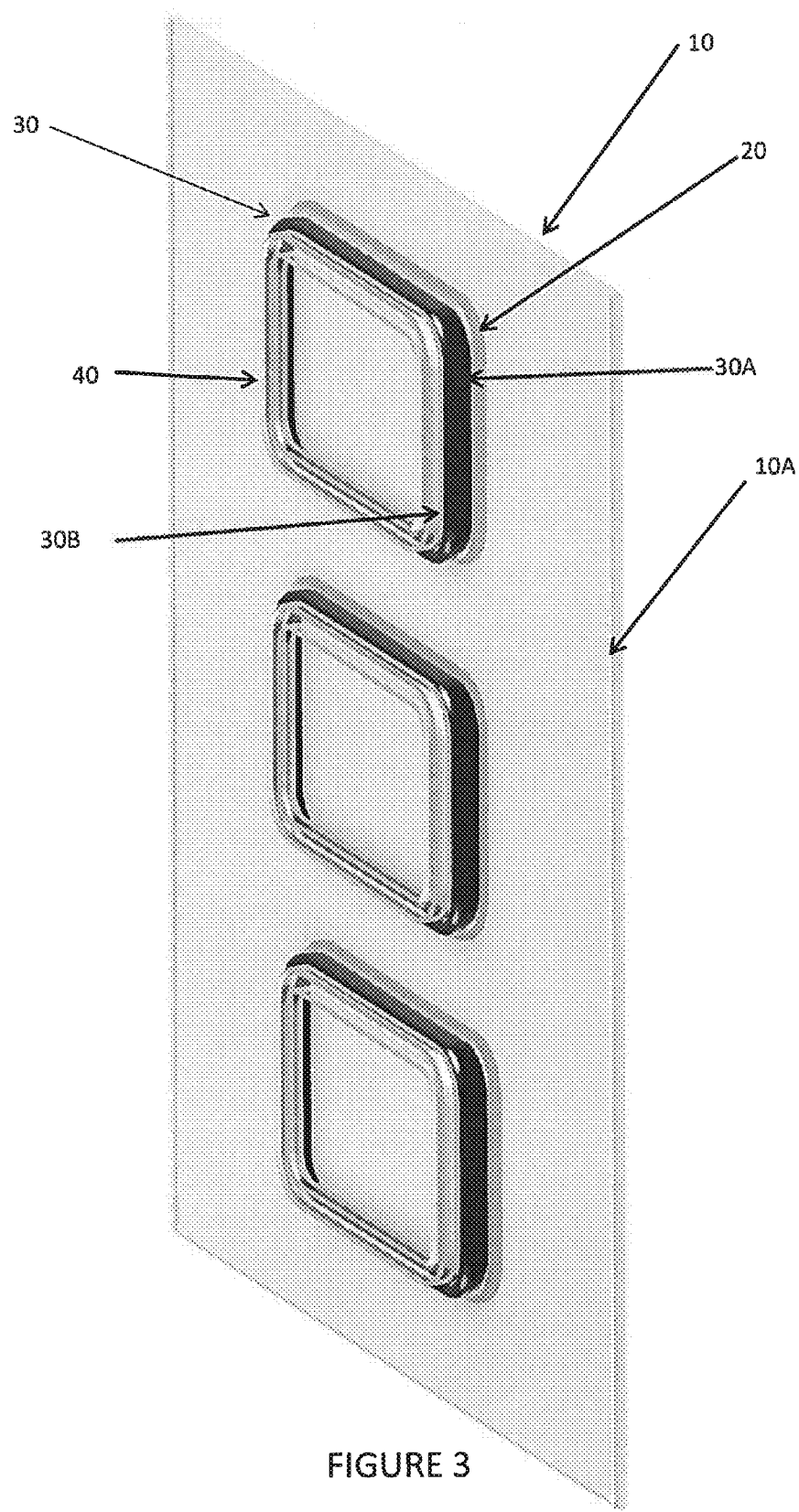
FIG. 3 is and isometric view of another preferred embodiment of a frame web in accordance with the current invention.
Figure 4:
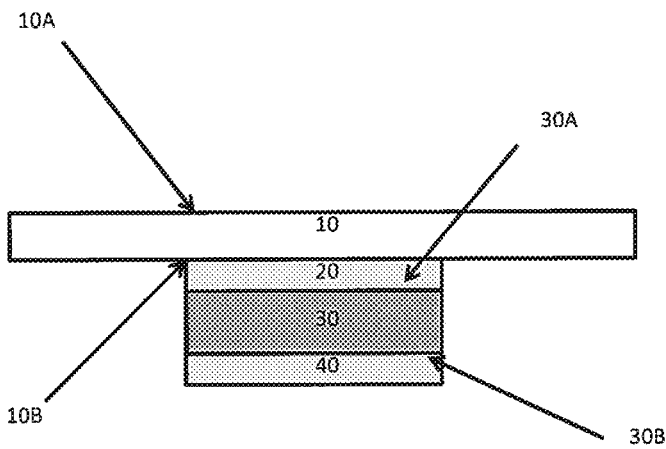
FIG. 4 is cross-sectional view of a preferred embodiment of a frame web in accordance with the current invention.
Figure 5:
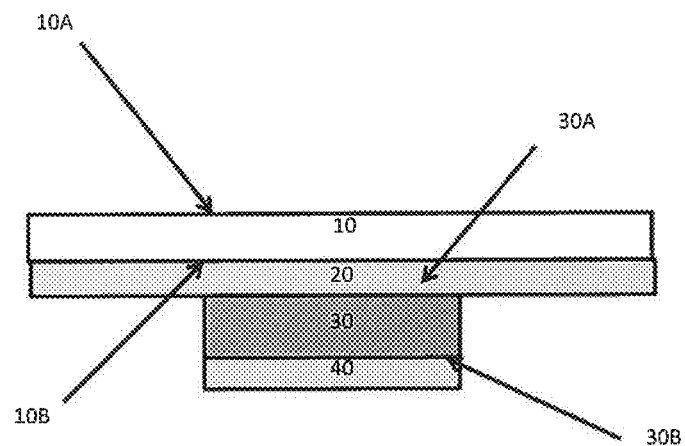
FIG. 5 is a cross-sectional view of another preferred embodiment of a frame web in accordance with the current invention.

FIG. 2 illustrates an isometric view of an embodiment of the current invention in which the adhesive 20 is applied as a continuous layer over the first face 10A of the carrier web 10. FIG. 3 provides an isometric view of an embodiment of the current invention in which the adhesive 20 is applied as a patterned layer, one that is sized and configured to match approximately the pattern of the frame element. The pattern of the adhesive in this particular embodiment is aligned with the placement of the frame elements 30. FIG. 4 is a cross-sectional view of the embodiment of FIG. 3, where adhesive 20 is applied to side 10B of web 10 as a patterned layer. FIG. 5 is a cross-sectional view of the embodiment of FIG. 2, where adhesive 20 is applied as a continuous layer. Both FIGS. 3 and 4 also contain adhesive layer 40, which is applied to side 30B of frame web 30.

Figure 6:
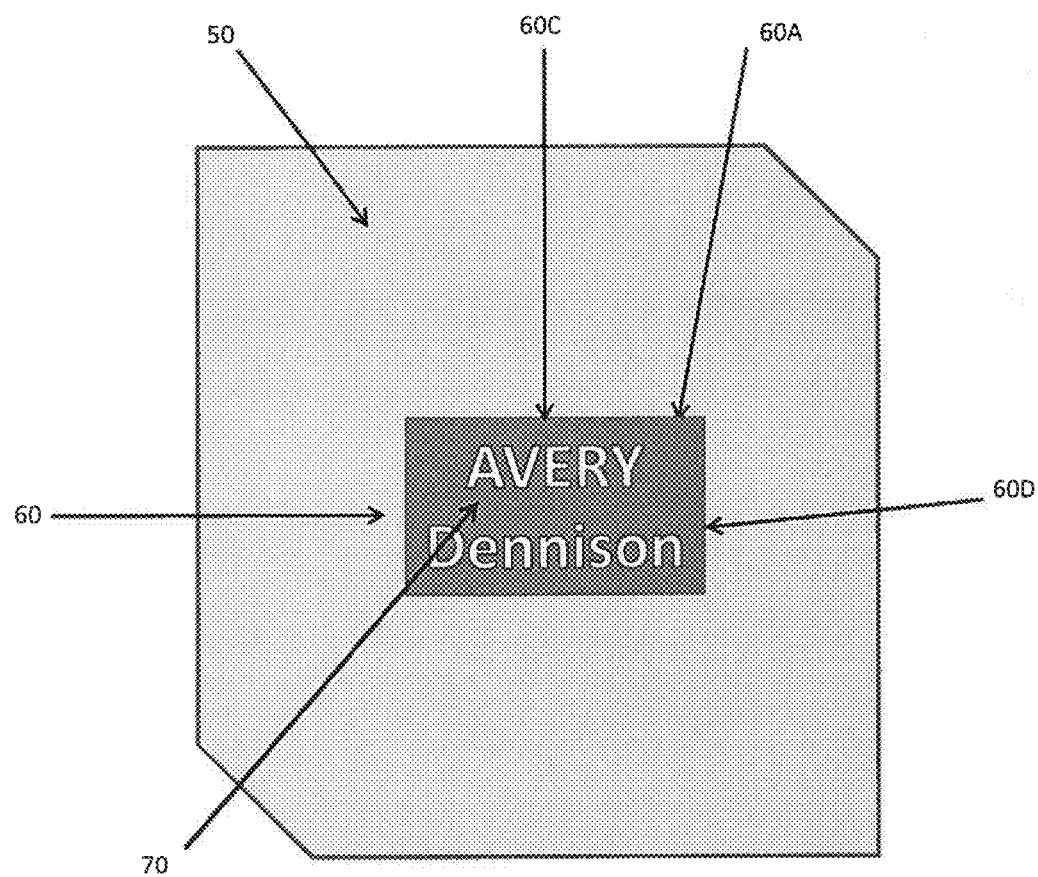
FIG. 6 is a plan view of an article and a label used in accordance with the present invention.

FIG. 6 shows a substrate 50 and a label 60. Although the label 60 and substrate 50 are shown in a generally rectangular shape, the current invention is not limited in application to substrates and label of this size and shape and the invention may include any geometric, alpha or numeric arrangement or any miscellaneous design, such as a trademark logo, trade dress, brand information or the like. The label 60 may be any desired shape for the intended purpose. The substrate 50 may not only be a shape, but a complete garment, such as a t-shirt, hat, apparel accessory, shoes, shorts, etc.

The substrate may be a garment, apparel item, accessory or similar item. It can be made from a wide variety of fabric types including, but not limited to, natural and synthetic fibers including cotton, nylon, polyester, rayon, Spandex® and combinations thereof.

The label may use any known materials for labeling articles. In an exemplary embodiment the label is a woven label. The label 60 can have first and second sides (60B, 60C) and an external perimeter 60A. The label can have indicia or a graphic 70 on its first side and an adhesive on the second side. In an embodiment, it is not necessary for the label to have adhesive on the second side. Graphic or indicia 70 can be applied to the label by any procedure including printing, sewing or heat transfer methods.

Figure 7:
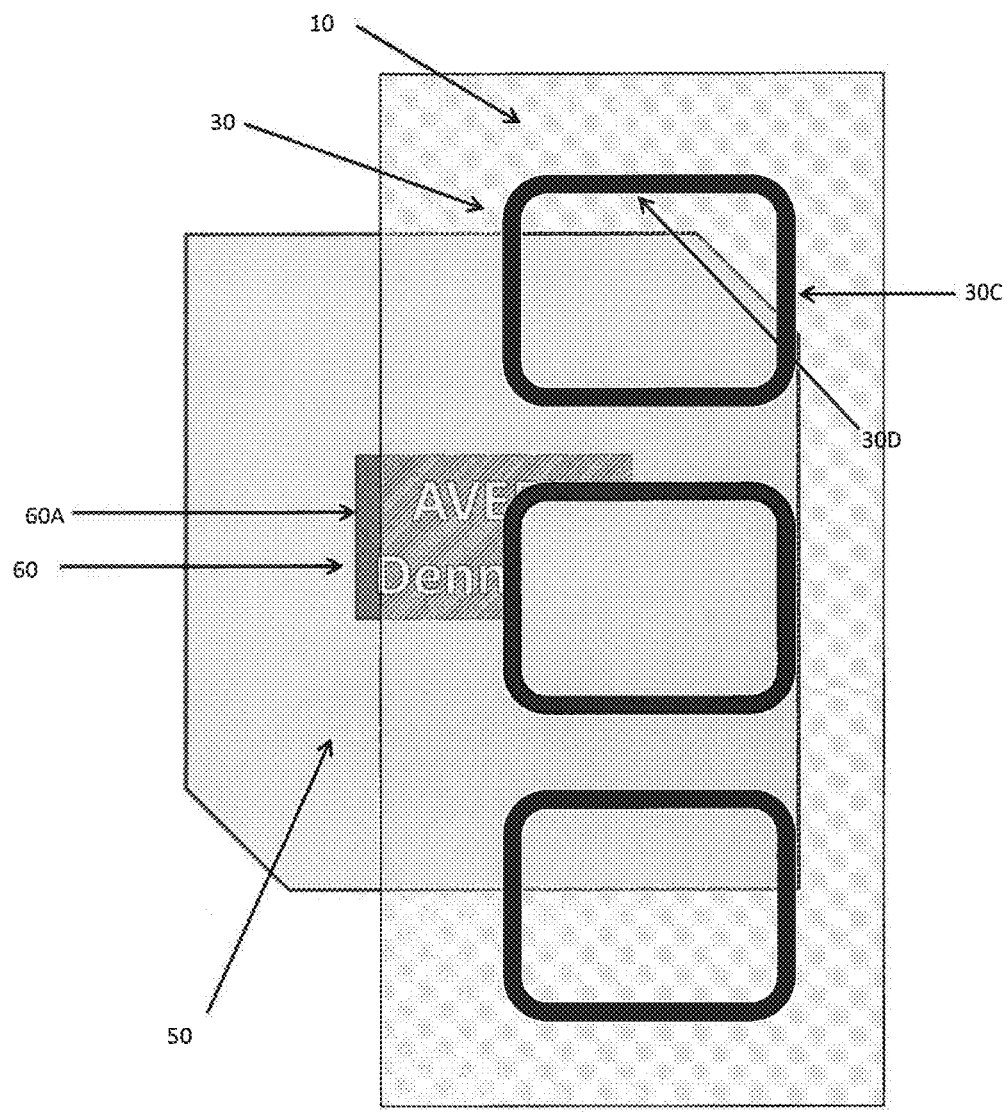
FIG. 7 is an article and a label in conjunction with the frame web of the current invention.

FIG. 7 is a front view of an intermediate assembly arrangement for securing a label as disclosed herein. The assembly includes the frame web 10, a label 60 and a substrate 50 as described above.

In an exemplary embodiment, the frame element 30 of the frame web 10 has an inner perimeter 30C smaller than the external perimeter 60A of the label and an outer perimeter 30D larger than the external perimeter 60A of the woven label. However, the overlap can vary based on the desired look or use of the labeled article.

Figure 8:
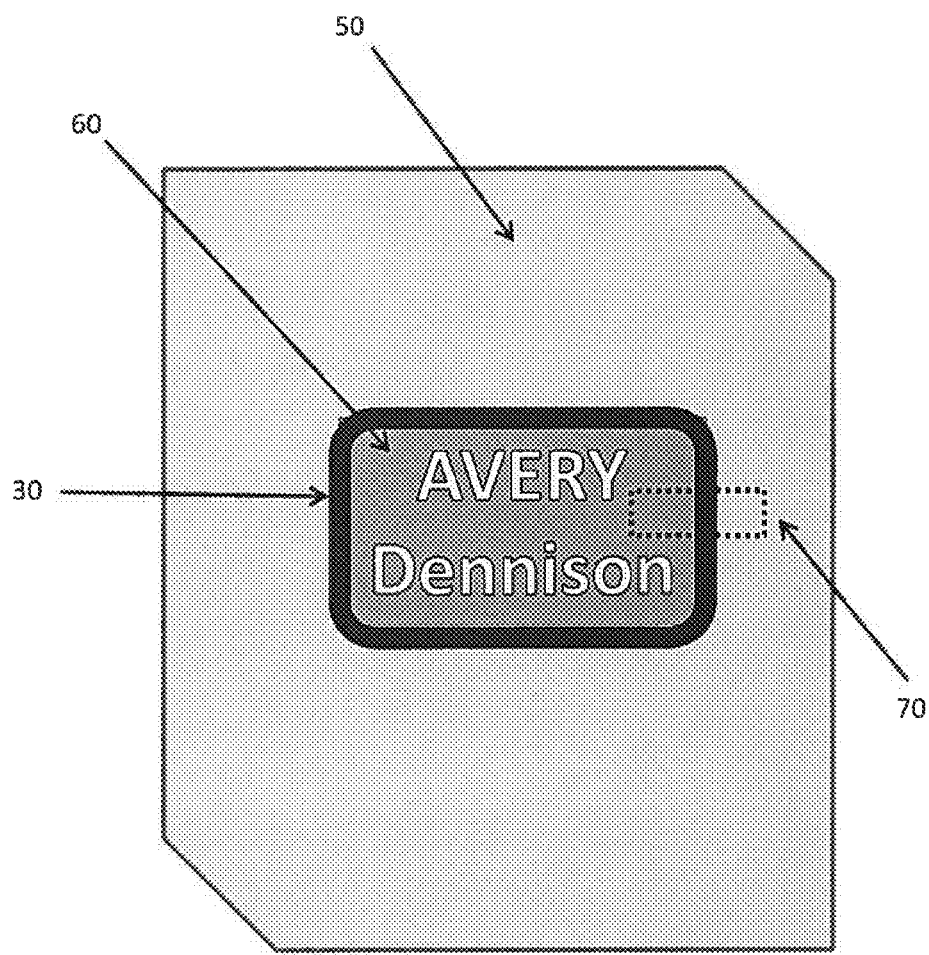
FIG. 8 is an article with an attached label and a frame element of one embodiment of the current invention.

FIG. 8 shows a label 60 attached to a substrate 50 and overlaid and peripherally adhered by the frame element 30 of one embodiment of the current invention. The frame element 30 extends about the periphery of the label and is not intended to obscure any indicia or graphics appearing on the label 60.

Figure 9:
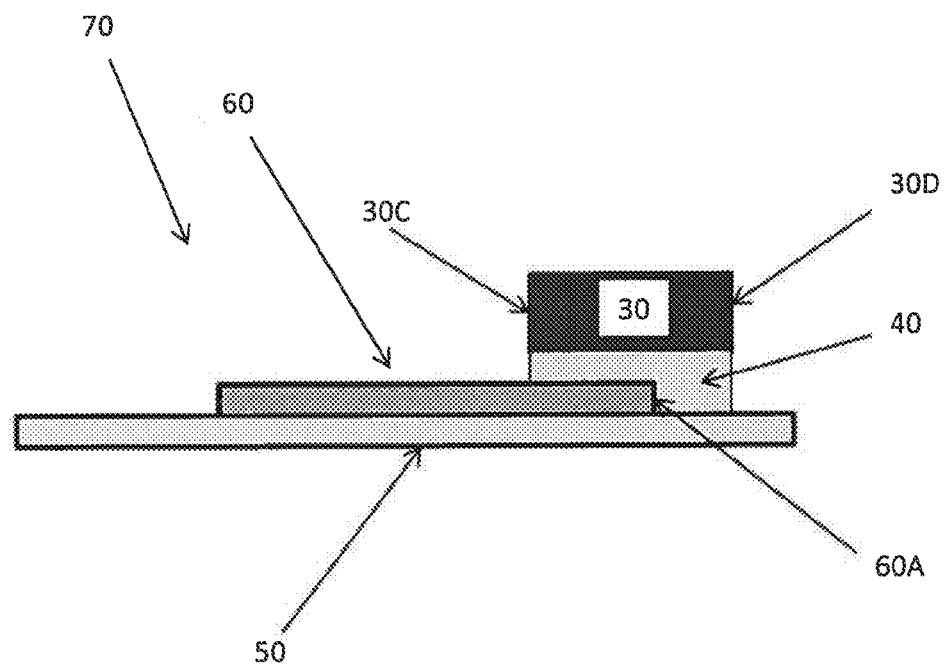
FIG. 9 is a cross-sectional view of a portion of the article of FIG. 8.

FIG. 9 is a cross-sectional view of portion 70 of FIG. 8. FIG. 9 shows a portion of the label 60 and its periphery 60A. Label 60 is applied on top of substrate 50. Label 60 may be attached by an adhesive to substrate 50 or simply place on substrate 50. Frame element 30 has inner perimeter 30C, outer perimeter 30D, and adhesive layer 40. Inner perimeter 30C is smaller than label periphery 60A and therefore overlaps label 60, while outer perimeter 30D is larger than label periphery 60A and therefore is outside of label periphery 60A.

Figure 10:
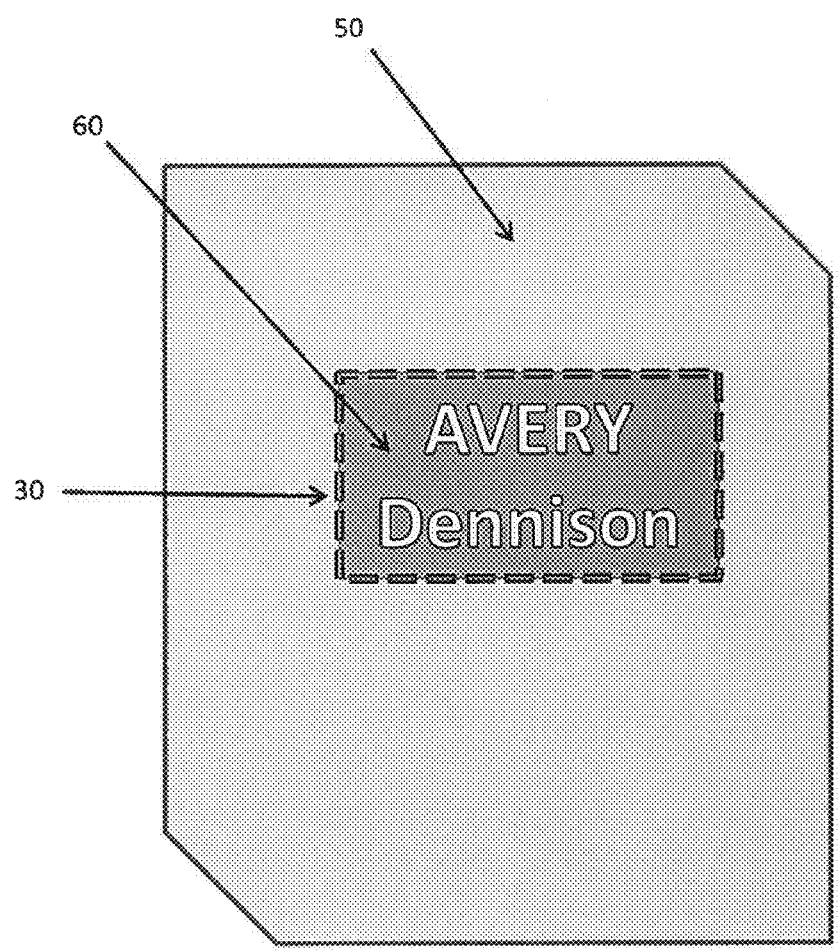
FIG. 10 is an article with an attached label and a frame element of one embodiment of the current invention.

FIG. 10 shows an exemplary embodiment of the current invention. In FIG. 10, the frame element 30 has a textured or printed appearance 60 to make the frame element 30 look more like sewing or stitching at the periphery 60A of the label 60.

Figure 11:
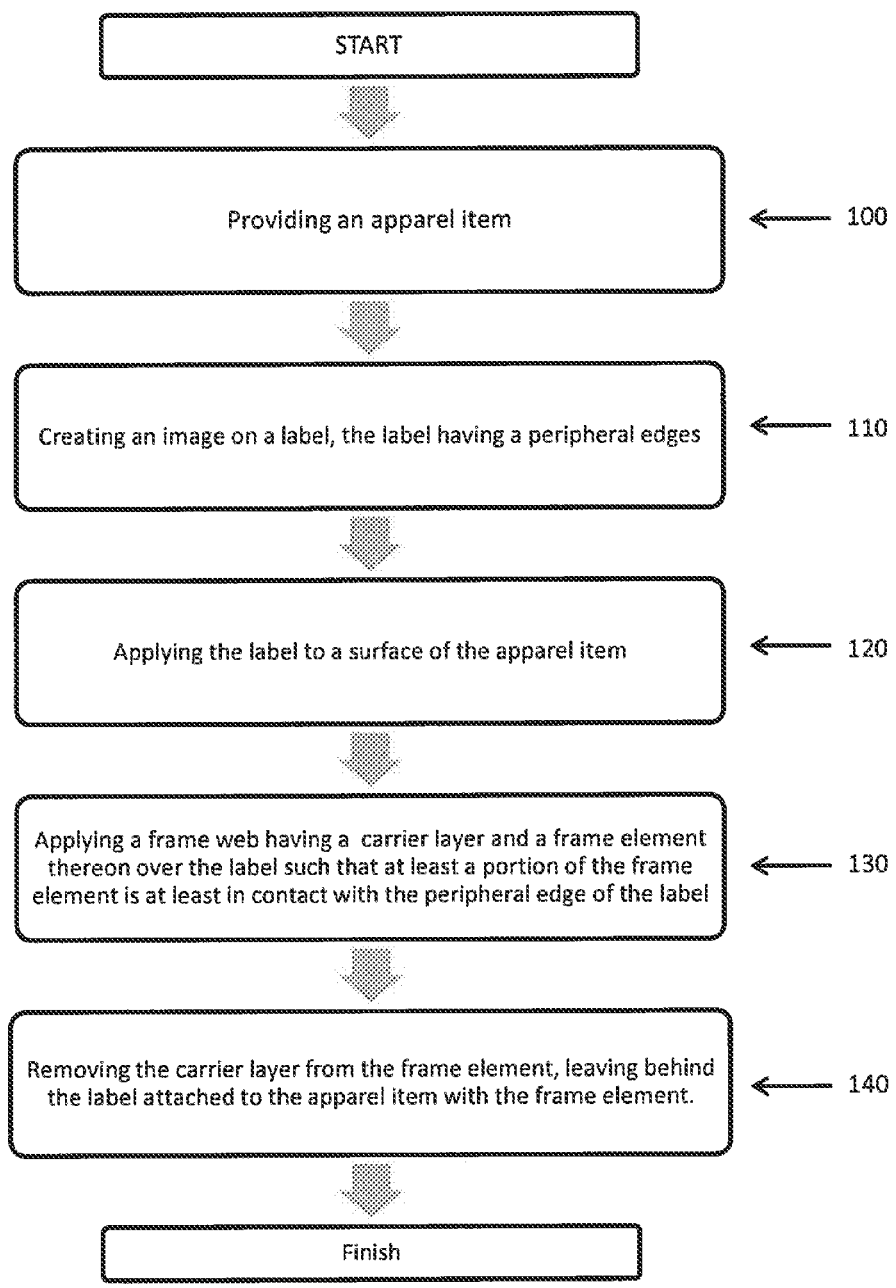
FIG. 11 shows a flow chart showing the steps in an exemplary method of adhering a label to an article as disclosed in the current application.

FIG. 11 provides an exemplary flow chart of a representative method of making a branded apparel item. The method includes the steps of providing an apparel item at step 100, and then creating an image on a label at step 110. Next, at step 120 the label is applied to a surface of the apparel item, and then at step 130 a carrier layer which has a frame element thereon is positioned over the label at step 130 such that at least a portion of the frame element is at least in contact with the peripheral edge of the label and preferably extending slightly beyond the edge of the label. Finally, at step 140 the carrier layer is removed from the frame element so that the label remains attached to the apparel item with the frame element.

The frame element 30 of the present invention may contact the apparel item 50 and label in varying degrees. A portion of the frame element 30 may be in contact with the surface of the apparel item 50. At least a portion of the frame element 30 may also contact the label 60. That is, as the outer perimeter of the frame element is larger than the outer perimeter of the woven label, the outer perimeter of the frame element will contact the apparel item with the internal perimeter of the woven label contacting the woven label.

There are several methods by which the label 60 can be applied to the surface of the apparel item 50. In one exemplary embodiment, the label 60 is applied by simply placing the label 60 on top of the apparel item 50 without any adhesive or means of attaching. In another embodiment, the label 60 may be attached by an adhesive. The adhesive can be any of those known in the prior art or disclosed in the specification above.

There are a variety of ways to apply the frame web to the label 60 and article 50. The frame web 10 may simply be applied with adhesive and pressed down to contact the label 60 and article 50 thereby holding the label 60 to the article 50 by adhesive bonding. If the adhesive layer 40 (on side 30B of the frame element) is thermally activatable, the frame element 30 and/or carrier layer 16 may be heated in order to soften the adhesive and fully adhere the frame element 30 to the article 50 and label 60.

It will thus be seen according to the present invention a highly advantageous article label has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. An assembly for securing a label to a substrate, comprising;
    a substrate having first and second surfaces;
    a label having first and second sides and having an external perimeter, the label having adhesive on a second side and indicia on the first side;
    a frame web, comprising:
        a carrier web having first and second faces, the first face having an adhesive; and
        a frame element having first and second sides, the first side having an adhesive and the second side adhesively bonded with the first face of the carrier web to form a first adhesive bond, the frame element having an inner perimeter smaller than the external perimeter of the label and an outer perimeter larger than the external perimeter of the label with at least a portion of the frame element applied over the label such that the internal perimeter of the frame element is in adhesive contact with the label to form a second adhesive bond and the external perimeter of the frame element is in adhesive contact with at least a portion of the substrate and the frame element is provided with at least one of a textured or imaged appearance of stitching or sewing, wherein the second adhesive bond is stronger than the first adhesive bond; and
        the substrate is an apparel item.

2. An assembly as recited in claim 1, wherein the frame element is composed of polyurethane, polyester, polyethylene.

3. An assembly as recited in claim 1, wherein the adhesive on the frame element is a permanent adhesive.

4. An assembly as recited in claim 1, wherein the adhesive on the carrier web is a light tack adhesive.

5. The assembly of claim 1, wherein the adhesive on the first face of the carrier web is patterned to the frame elements.

6. The assembly of claim 1, wherein the frame element includes at least one of fluorescent or reflective features.

7. The assembly of claim 1, wherein the label is a woven material.

8. A method for making a branded apparel item, comprising the steps of;
    providing an apparel item;
    creating an image on a label made of a woven material, the label having a peripheral edge;
    applying the label to a surface of the apparel item;
    applying a frame web having a bottom surface adhesively bonded on a carrier layer without heat, the frame web having at least one frame element thereon over the label such that at least a portion of a top surface of the frame element is adhesively bonded with the peripheral edge of the label, wherein the strength of the adhesive bond between the top surface and the peripheral edge is greater than the adhesive bond between the bottom surface and the carrier layer; and
    removing the carrier layer from the frame element, leaving the label attached the apparel item with the frame element.

9. The method of claim 8, wherein at least a portion of the frame element is in contact with the surface of the apparel item.

10. The method of claim 8, wherein at least a portion of the frame element is in contact with the label.

11. A frame web for attaching a label to an article, comprising:
- a carrier web having first and second faces, the first face having an adhesive disposed on a portion of the carrier web;
- at least one frame element that includes at least one thermoplastic resin and having first and second sides, the first side having an adhesive for bonding with the label and the second side adhesively bonded with the adhesive disposed on the first face of the carrier web to form an adhesive bond with at least a portion of the frame element applied over the label and the label is made of a woven material, wherein the strength of the bond between the firs side of the frame element and the label is stronger than the adhesive bond between the first face and the second side of the frame element.

12. The frame web of claim 11, wherein there are a plurality of frame elements.

13. The frame web of claim 11, wherein the adhesive on the first face of the carrier web is patterned to the frame elements.

14. The frame web of claim 11 wherein the adhesive on the first face of the carrier web is a continuous layer.

15. The frame web of claim 11, wherein the adhesive on the frame element is a pressure sensitive adhesive.

16. The frame web of claim 11, wherein the adhesive on the frame element is a thermally activatable adhesive.

17. A labeled apparel article, comprising;
- an apparel article having first and second surfaces;
- a label having first and second sides and having an external perimeter, the label having adhesive on a second side and indicia on the first side, with the label attached to a portion of the apparel article;
- a frame element having first and second sides, with at least a portion of the frame element applied over the label, the frame element being adhesively bonded to a carrier layer and having an inner perimeter smaller than the external perimeter of the label and an outer perimeter larger than the external perimeter of the label such that the internal perimeter of the frame element is in adhesive contact with the label and the external perimeter of the frame element is in adhesive contact with at least a portion of the apparel article and the frame element includes at least one of fluorescent or reflective features, wherein the adhesive contact between the frame element and the label is stronger than the adhesive bond between the frame element and the carrier layer.

18. The labeled apparel article of claim 17, wherein the label is woven.

* * * * *